United States Patent
Aben (10) Patent No.: US 7,864,997 B2
(45) Date of Patent: Jan. 4, 2011

(54) METHOD, APPARATUS AND COMPUTER PROGRAM PRODUCT FOR AUTOMATIC SEGMENTING OF CARDIAC CHAMBERS

(75) Inventor: Jean-Paul Maria Michel Aben, Limbricht (NL)

(73) Assignee: PIE Medical Imaging B.V., Maastricht (NL)

(*) Notice: Subject to any disclaimer, the term of this patent is extended or adjusted under 35 U.S.C. 154(b) by 1286 days.

(21) Appl. No.: 11/380,681

(22) Filed: Apr. 28, 2006

(65) Prior Publication Data

US 2007/0253609 A1 Nov. 1, 2007

(51) Int. Cl.
  *G06K 9/00* (2006.01)
(52) U.S. Cl. .......... 382/128; 382/130; 382/131; 382/154; 382/129; 382/134; 600/407; 600/410; 600/447; 600/461
(58) Field of Classification Search .......... 382/128, 382/129, 130, 131, 132, 154; 434/262–272; 378/1–210; 600/410, 372
See application file for complete search history.

(56) References Cited

U.S. PATENT DOCUMENTS

| | | | | |
|---|---|---|---|---|
| 5,239,591 | A * | 8/1993 | Ranganath | 382/128 |
| 6,438,403 | B1 * | 8/2002 | Cline et al. | 600/410 |
| 7,646,901 | B2 * | 1/2010 | Murphy et al. | 382/128 |
| 2006/0241376 | A1 * | 10/2006 | Noble et al. | 600/410 |

OTHER PUBLICATIONS

Kass, et al, "Snakes: Active Countour Models" International Journal of computer Vision, pp. 321-331 (1988).
Cosoco, et al "Automatic cardiac region-of-interest computation in cine 3D Structural MRI" International Congress Series 1268 (2004) pp. 1126-1131.
Nobuyuki Otsu, "A Threshold Selection Method from Gray-Level Histograms" IEEE Transactions on Systems, Man, and Cybernetics, vol. SMC-9, No. 1, Jan. 1979 pp. 62-66.
Udupa et al "Fuzzy Connectedness and Object Definition: Theory, Algorithms, and Applications in Image Segmentation" Graphical Models and Image Processing vol. 58. No. 3, May, pp. 246-261, 1996.

* cited by examiner

*Primary Examiner*—Vikkram Bali
*Assistant Examiner*—Nancy Bitar
(74) *Attorney, Agent, or Firm*—Gordon & Jacobson, PC (57) ABSTRACT

A method, apparatus and computer program product for machine-based segmentation of the cardiac chambers in a four-dimensional magnetic resonance image data that contains at least short-axis cine sequences. The segmenting is based on temporal variations in the data set and on features extracted from the image data. In particular, the method and apparatus process the image data to automatically segment an endocard based on fuzzy object extraction and to automatically segment an epicard through finding a radial minimum cost with dynamic sign definition and tissue classification. In addition, image data is preferably preprocessed to eliminate high local image variances and inhomogeneity. The image data is also preferably processed to identify positions of a base slice, an apex slice, an end-diastole, an end-systole and an LVRV connection.

20 Claims, 5 Drawing Sheets

METHOD, APPARATUS AND COMPUTER PROGRAM PRODUCT FOR AUTOMATIC SEGMENTING OF CARDIAC CHAMBERS

BACKGROUND OF THE INVENTION

1. Field of the Invention

This invention relates broadly to cardiothoracic imaging. More particularly, this invention relates to segmenting cardiac chambers in a four-dimensional magnetic resonance image.

2. State of the Art

Accurate and reproducible assessment of the left and right ventricular volumes and ejection fraction is essential for the prognosis of patients with heart disease and for evaluating therapeutic response. Magnetic resonance (MR) imaging has proven to be an accurate and reproducible imaging technique for the quantitative analysis of left and right ventricular functions. Ventricular volumes and mass as well as regional functional parameters such as wall motion and wall thickening, especially for the left ventricle, can be obtained in the true short-axis plane of the ventricle. These short-axis views have various advantages. Since wall motion and wall thickening takes place mainly perpendicularly to the viewing direction, they can be followed best in this direction. Furthermore, partial volume effects are minimized. A major advantage of MR imaging is that it does not use ionizing radiation and is non-invasive since no contrast agent is used. Through using multiple imaged slices a combination of spatial and time coordinates is considered.

Chris A. Cocosco, in "Automatic cardiac region-of-interest computation in cine 3D structural MRI", CARS and Elsevier, 2004, describes a method for extracting a region of interest around the heart in short-axis MRI cardiac scans. The method produces a region within four-dimensional (4D) datasets wherein the left and right ventricles are localized. No attempt is made to differentiate between the left and the right ventricle. Neither are the base and apex locations of the ventricle(s) defined. The method may in particular fail whenever high local variances are present in the 4D dataset that may originate from main blood vessels (lung/aorta) or from specifically superimposed text such as trigger time. The method may also fail when the 4D image contains an inhomogeneity. This inhomogeneity can be caused by lower sensitivity at a larger distance between the heart and the imaging coils of the MR apparatus which then leads to lower pixel intensity in the image.

SUMMARY OF THE INVENTION

The present invention presents a more systematic approach, in that it does not rely on anatomy assumptions. First, it locates the left and right ventricles. Then the base short axis slice and the apex of the left ventricle short-axis slice are located. Next, the start conditions for the segmentation process are determined. The locations of the left ventricle, the left ventricle epicard and finally the right ventricle endocard are detected approximately. Based on these start conditions the segmentation process starts. Note that various standard acquisitions of MR cardiac imaging are used, such as the short axis (SA) and long axis (LA) orientations. Finally the papillary muscles of the left ventricle are detected. Advantageously, the methodology of the present invention is fully automatic without user interactions based on intermediate results, which can yield 100% reproducibility.

Two procedures can be followed. In the first procedure, a 3D fuzzy extraction is followed by a fine tuning step to accurately locate the left ventricle endocard and epicard. In the second procedure, a new contour propagation algorithm locates the left ventricle endocard and epicard. Neither of the two above procedures relies on any anatomy assumption, which makes the segmenting also suitable to use with diseased ventricles that may be deformed to a certain extent.

The segmentation process is improved over the prior art segmentation techniques, which range from being purely data driven (using edge detection and region growing) on the one hand, to being model driven on the other hand.

One such prior art segmentation technique, the so-called "snake" model, presents a framework that is the basis of boundary driven image segmentation operations. The "snake" model is described by G. Kass in "Snakes: Active Contour Models", Int. Journal of Computer Vision, 1, pp. 321-332, 1988. Briefly, the snake model refers to an energy minimization technique that seeks for the lowest potential of a curve-based function. This function is a compromise between boundary terms and image terms. However, this segmentation method is quite sensitive to noise and physically artifacted image data. Various modifications thereto have been proposed, but the method remains sensitive to user-defined start conditions, which endanger the reproducibility of the segmentation.

Another example of a prior art segmentation technique is described in U.S. Pat. No. 5,239,591, "Contour extraction in multi-phase, multi-slice cardiac MRI studies by propagation of seed contours between images", which is incorporated by reference herein in its entirety.

The segmentation process of the present invention corrects for data acquisition and/or subject-caused movement in the acquired MR image data set by using system coordinates from an MR scanner apparatus. In this way, accuracy is improved without disturbing the sequence of image pick-up operations. Moreover, the segmentation of the endocardial and epicardial features starts from an operator-defined seed contour and is based on a radial minimum cost with dynamic sign definition and tissue classification. Apart from such elementary user input, all further operations are machine-controlled, which yields excellent reproducibility.

In addition, the methodology of the present invention automatically detects Left Ventricle Right Ventricle (LVRV) connection position. Clinicians are recognizing this information as highly helpful.

Moreover, the methodology of the present invention estimates volume(s) of the heart which is/are derived from the spatial location of the heart's apex position on a curve that is obtained from the long axis cine sequences. In addition, such volume estimates preferably are derived from a mitral valve position obtained from long axis cine views. Such processing improves the accuracy of such volume estimate(s).

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
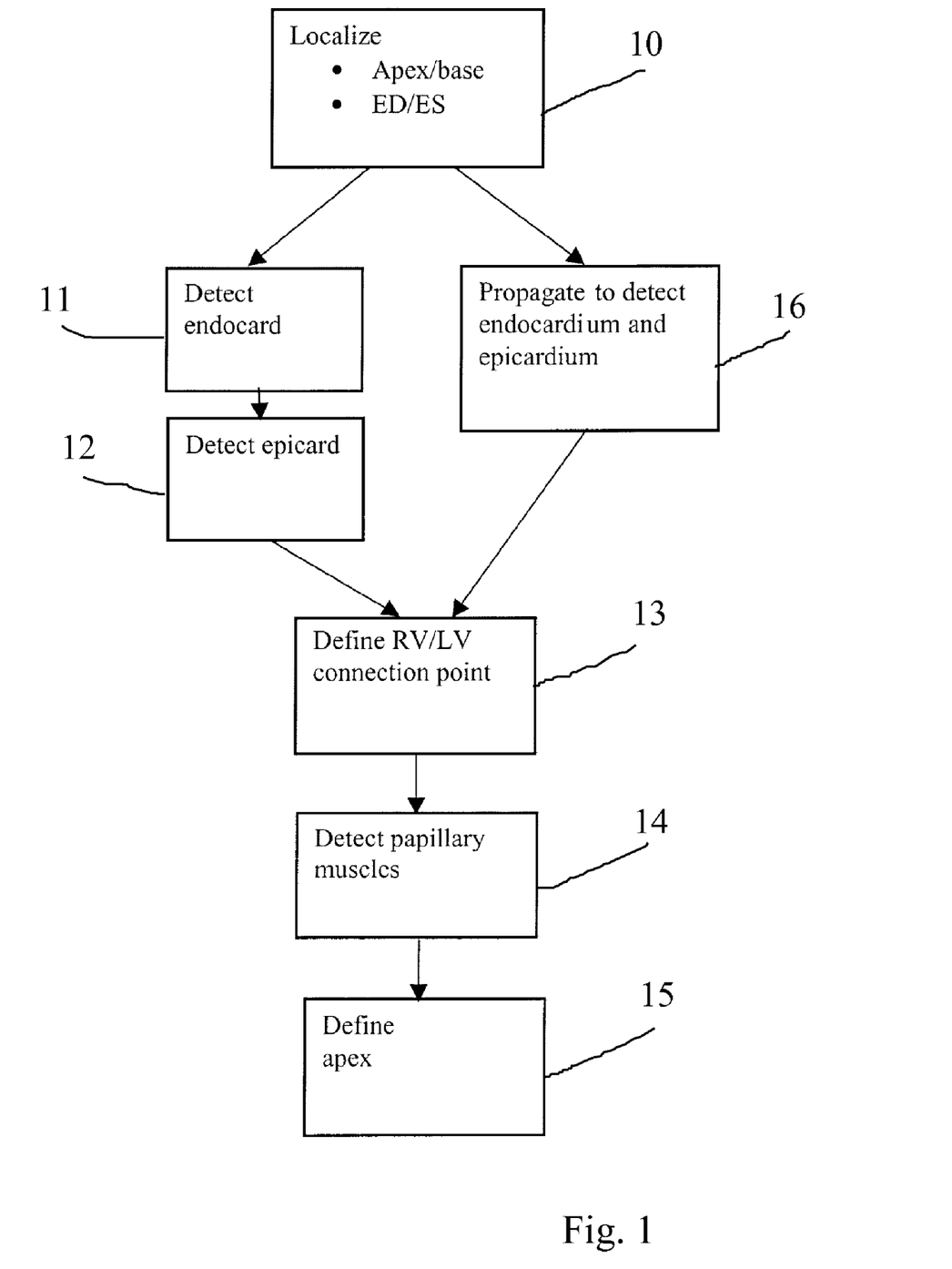
FIG. 1 is a flow chart illustrating various processing steps of the methodology of the present invention.

Turning now to FIG. 1, there is shown a flow chart of various processing steps in accordance with the present invention. First, in block 10 (localize Apex/Base of left ventricle, estimate epicard, find end of diastole, end of systole), the 4D MRI dataset is processed to localize the left and right ventricles therein. This dataset contains a sequence of short axis cine images that cover the heart, combined with two-chamber and four-chamber cine sequences.

Figure 4:
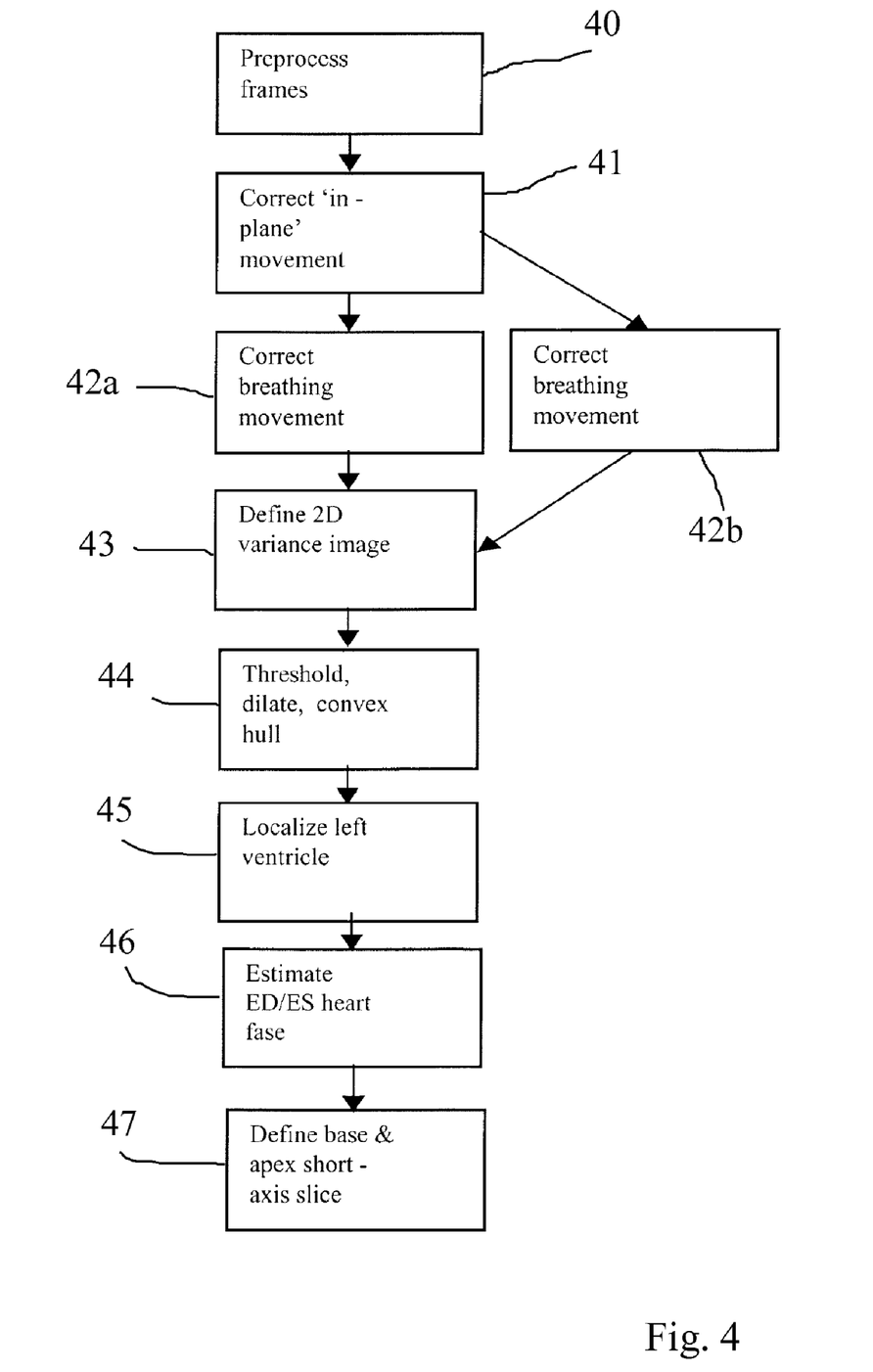
FIG. 4 is a flow chart illustrating the operations in locating the heart's left and right ventricle in accordance with the present invention.

As an alternative to the above, it is possible to work with short-axis images only. Within this operation, the base and apex short axis slices are located as well as the end systole and end diastole heart phase in time. In this respect, FIG. 4 illustrates a flow diagram of the locating process for the heart's left and right ventricles, as a substitute for block 10 in FIG. 1. The remainder of FIG. 1 will be discussed later.

Turning to FIG. 4, in block 40, the images are preprocessed to eliminate high local variance and inhomogeneity according to the expression (1) below. Therein, $I_p$ is the 2D image array that is subjected to conventional Fourier transform methods to render the result more reliable.

$$I_p = \mathcal{F}^{-1}\{\mathcal{F}(I\Theta b) \cdot H\} \cdot T(-P_{shift}) \quad (1)$$

where $H = 1 - e^{\frac{-r^2}{2 \cdot \partial^2}}$ in case of inhomogeneity $H = 1$ otherwise $b$ is a square structured element $P_{shift}$ is the displacing caused by acquisition In the preprocessing operations of block 40, grey level erosion or "thinning" is effected, after which a filter eliminates low frequencies caused by inhomogeneity. The inhomogeneity is detected by resampling along a scan line that runs from the centre of the two chamber and four chamber epipolar intersection lines, called $l_{2ch}$ and $l_{4ch}$ respectively, in the first frame of the middle short-axis slice. This is followed by executing a first Gaussian derivative operation.

From the centre, the positions of the steepest absolute slopes $l_p$ and $r_p$ to the left and right are located. Between those positions a linear fit is performed based on the resampled image data. Whenever the absolute slope of this linear fit exceeds a certain threshold it is assumed that the short axis image data set contains an inhomogeneity.

Moreover, in the preprocessing operations of block 40, the displacement caused by the data acquisition is derived and corrected for. For acquiring the short-axis data set typically 8 mm thick cine short-axis slices with breath-holding by the patient will encompass the entire left ventricle from apex to base. During this process the MR acquisition parameters for the acquired spatial slice location could have changed such that they do not fit perfectly in the acquired bounding box. By using the absolute system coordinates obtained from the MR system (through the "headers" of the conventional DICOM file format), it is possible to correct for these 'in-plane' movements.

Figure 2:
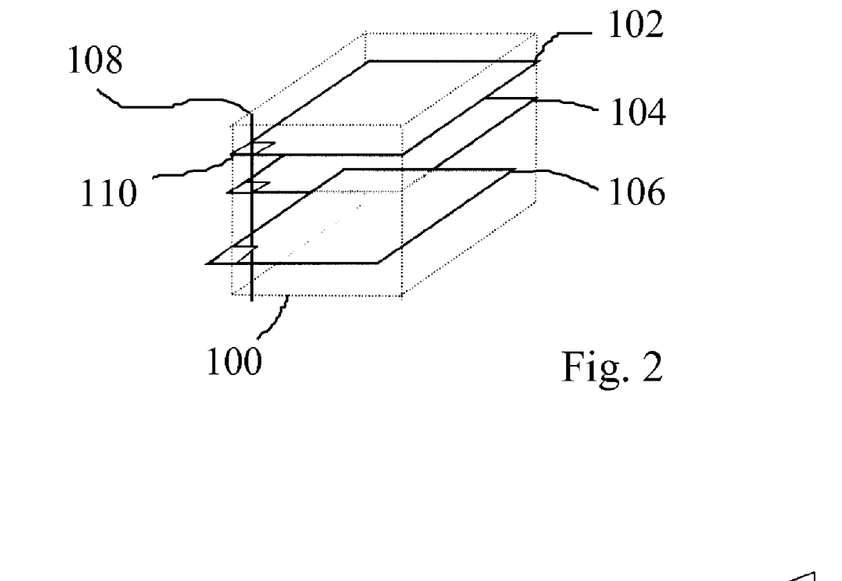
FIG. 2 is a schematic representation of in-plane movement which is identified and corrected by the methodology of the present invention.

In this respect, FIG. 2 illustrates a spatial configuration of this in-plane movement. In this FIG. 2, item 100 is the bounding box, two successive planes have been labelled 102 and 104, respectively, and the plane wherein the actual in-plane movement occurs has been labelled 106. The line 108 should run continuously along the respective first elements that have been shown as perspective squares (110), of which the lowest one as shown has been shifted to the front of the bounding box.

Turning back to FIG. 4, the operations continue to block 41 to correct for such "in-plane" movement. Such operations begin by identifying the starting plane (102) and then computes the three-dimensional (3D) line l that runs perpendicularly through this starting plane (102) at the first image element (pixel/voxel) (110) of the image frame identified by starting plane (102). Next, for each one of a number of successor planes, the displacement between the first element of the successor plane under investigation and the 3D line l is computed. In pseudo code:

$$V_1 = P_1 + \mu \cdot R_1 + \gamma \cdot C_1$$

$$l = P_1 + (\mu \times C_1) \cdot \alpha \quad (2)$$

Next, the intersection point $P_{3D}$ of the line l with the successor planes is defined in the 3D world coordinate system:

$$P_{3D} = l \cap V_n \{n > 1\} \quad (3)$$

Finally, the intersection point $P_{3D}$ is transformed into the two-dimensional (2D) coordinate system of the successor plane:

$$P_{2D} = \begin{bmatrix} 1 \\ 1 \\ 0 \end{bmatrix} \cdot S(1/voxelsize_n) \cdot R_n \cdot T(-P_n) \cdot P_{3D} \quad (4)$$

Here, the rotation matrix R is defined as the cross product of the plane direction vectors:

$$R = \begin{bmatrix} R_{1x} & C_{1x} & N_{1x} \\ R_{1y} & C_{1y} & N_{1y} \\ R_{1z} & C_{1z} & N_{1z} \end{bmatrix} \quad (5)$$

$$N = R \otimes C$$

For a particular plane (e.g., slice), the displacement is defined as $P_{2D}$. All frames of the current plane will be shifted according to this vector $P_{2D}$. The step is repeated for the remaining planes along the short-axis stack.

In addition to such 'in-plane' movement, the patient can move between the acquired short-axis cine sequences, the two-chamber and the four-chamber cine sequence. This moving is specific for each examination and its magnitude depends mainly on how well the patient reproduces each breath-holding in an MR cine sequence. Typically, the motion ranges from zero to 10 mm. In block 42a a method is presented giving the physician the feasibility to evaluate in a quick and easy to use environment the quality of the MR acquisition in respect to slice movement. Thus, the physician can decide if some cine sequences should be taken once more while the patient is still available for MR acquisition. This improves the acquired dataset for further therapeutic usage without requiring an expensive patient recall for another MR.

The method in block 42a allows the physician to inspect the acquired MR dataset is by viewing the images from each acquired plane (used for treatment decisions) in a 3D environment conform the absolute system coordinates from the MR system. Generally, each image contains visible landmarks, such as organs and their details. Interpretation by the physician, e.g. the left ventricle, right ventricle, and viewing each image plane in a 3D environment spatially conform the 3D coordinates allows to quickly localize any movement visually.

Figure 3:
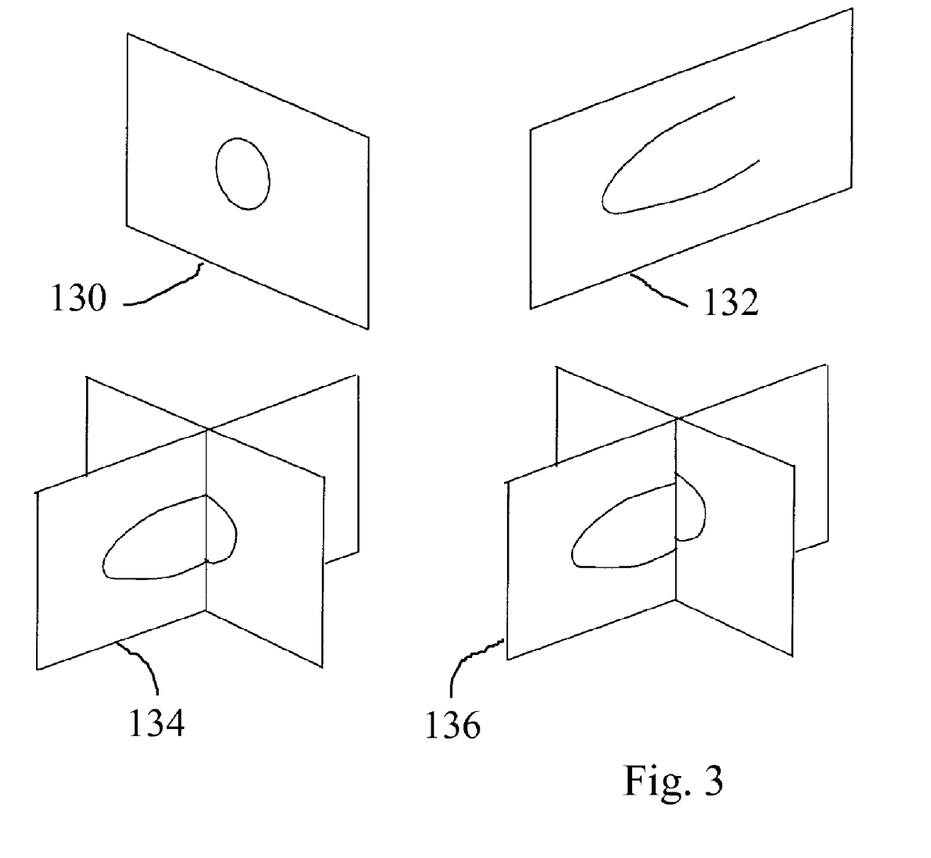
FIG. 3 is a three-dimensional visualization of breathing movement of a subject person.

FIG. 3 illustrates a three-dimensional visualization of breathing movement of a subject. Rotating this 3D visualisation renders evaluating the quality regarding movements in the MR image dataset straightforward. In FIG. 3, item 130 presents a single short axis slice, which has the shape of a closed form. Item 132 shows a two-chamber cine sequence that has the shape of a curve that is closed at one end, the apex, and open at the other. Combining these two without intermediate movement at item 134 shows the two curves to intersect. With breathing (or other patient caused movement) at item 136 show the two curves to be relatively displaced. This may lead to decide an image retake for correction in block 42a. Even better visualisation is acquired by image enhancing on the image dataset of each plane.

Automatically correction for breathing movements is achieved in block 42b by image registration techniques. In such techniques, a two-chamber image is created by resampling each short-axis image along the intersection line (epipolar line) of the two-chamber image, which gives an image which can be used for registration against the true two-chamber plane found during the acquisition. Breathing movement can now be computed by correlating in the Fourier domain each resampled line against the corresponding two-chamber intersection. This method can be extended with the four-chamber view.

In block 43, after preprocessing all short-axis frames, the total variance image of the complete short-axis dataset is generated. Because the short-axis images are perpendicular to the long axis of the ventricle (its z-axis corresponds to the voxel thickness) and the heart generally remains in motion, it is possible to effectively compress the 4D motion/variance into a single 2D image:

$$VAR = \frac{1}{n\_frames} \sum_{i=1}^{n\_frames} (I_{p_i} - \bar{I}_p)^2 \quad (6)$$

$$I_{variance} = MAX(VAR(\text{short axis } slice_n)) + \frac{\sum_{n=1}^{n\_slices}(VAR(\text{short axis } slice_n))}{n\_slices}$$

The mean intersection points derived from the two-chamber and four-chamber epipolar lines projected on each short-axis slice are smoothed and added to the overall variance image:

$$\bar{p} = \frac{\sum_{1}^{n\_slices} l_{2ch} \cap l_{4ch}}{n\_slices} \quad (7)$$

$l_{2ch} = V_{SA_i} \subset V_{2ch}$ mapped on $SA_i$ $l_{4ch} = V_{SA_i} \subset V_{4ch}$ mapped on $SA_i$ $\partial_p = STDEV(p)$ The mapping back on the SA slice is performed by:

$$P_{2D_{SA}} = \begin{bmatrix} 1 \\ 1 \\ 0 \end{bmatrix} \cdot S(1/voxelsize_{SA}) \cdot R_{SA} \cdot T(-P_{SA}) \cdot P_{3D} \quad (8)$$

The variance image is now adjusted with this information according to:

$$I_{totalvariance} = I_{variance} \cdot \sum_{i=p_y-\partial p_y}^{p_y+\partial p_y} \sum_{p_x-\partial p_x}^{p_x+\partial p_x} I_{variance_{(i,j)}} e^{-\left(\frac{(x-\bar{p}_x)}{2\partial p_x} + \frac{(y-\bar{p}_x)}{2\partial p_y}\right)} \quad (9)$$

Next in block 44 (threshold, dilate, convex hull), the generated variance image $I_{total\ variance}$ is smoothed with a Gaussian. Also, a dual threshold is defined. Preferably, the dual threshold is defined according to the Otsu threshold method described in N. Otsu "A threshold selection method for grey-level histograms" IEEE Trans. Syst. Man Cybernet SMC-01 (1970) pp. 62-66, herein incorporated by reference in its entirety.

After threshold selection, the occurrence of the detected objects is defined. When the first object covers an area of at least 85% of the histogram (FIG. 5), the threshold is based on the single method. Otherwise the threshold is selected between second and third objects derived from the histogram of $I_{total\ variance}$.

After thresholding/binarization, all holes in the binary image are filled in as based on a morphology operation. In a labelling operation the object with the largest area is extracted. The grey level erosion is undone again by a binary dilation with the same kernel as the earlier grey level erosion. Then, a binary dilation has a kernel size of approximately the myocard wall thickness. Finally a convex hull is fitted which localizes the complete left and right ventricles in the 4D short-axis dataset, defined as mask M. The short-axis slices are perpendicular to the long axis of the left ventricle, which allows to approximate the left ventricle by a circle in these short-axis slices.

In block 45, an adaptive Hough transform combined with the generated mask of the heart area, enables automatic location of the left ventricle. The Hough transform is well-known to persons skilled in the art for detecting features that can be described as a parametric equation. For a circle with a and b the coordinates of the centre and radius r, this is:

$x(t) = r \cdot \cos(t) + a$ $y(t) = r \cdot \sin(t) + b \quad (10)$

The localization of the left ventricle is done on the middle short-axis slice. Within this slice the most likely end-diastole frame is found by selecting the frame which has the most elements within the mask M and above the threshold as defined during the localization phase of the heart.

Within this frame, the edges are located preferably by a so-called Canny edge detector, which is well-known to persons skilled in the art. First, the frame is smoothed with a Gaussian filter to reduce noise and unwanted details. Then, magnitude and direction of the gradient are calculated.

$$\nabla I = \sqrt{|G_x^2 + G_y^2|} \cap M \quad (11)$$
$$\theta = \tan^{-1}(G_y/G_x) \cap M$$

The kernels used to derive $G_x$ and $G_y$ are:

$$G_X = \begin{bmatrix} -1 & -2 & -1 \\ 0 & 0 & 0 \\ 1 & 2 & 1 \end{bmatrix}, G_y = \begin{bmatrix} -1 & 0 & 1 \\ -2 & 0 & 2 \\ -1 & 0 & 1 \end{bmatrix} \quad (12)$$

The gradient magnitude image $\nabla I$ is binarized to $1_{bin}$ using a predefined threshold. This gives a feature map that contains the edges and background. The edges are likely located on the perimeter of the circle that must be detected. Therefore, every detected edge point at (x,y) of $1_{bin}$ is parsed and suggested to be on a circle boundary with radius r between $r_{min}$ and $r_{max}$. The position of the centre $(C_x,C_y)$ is then predicted from the edge location (x,y), the gradient direction $\theta$ and its radius r.

$$C_x = x - r \cdot \cos(\theta)$$
$$C_y = y - r \cdot \sin(\theta) \quad (13)$$

Where $r \in [r_{min}, r_{max}]$

All found elements $(C_x, C_y)$ are accumulated into the Hough image space H which is processed with a second order Gaussian derivative within the mask M.

$$\nabla^2 H = H \cdot \left( \frac{(x^2+y^2) - \sigma^2}{\sigma^4} \right) \cdot e^{-\left(\frac{(x^2+y^2)}{2\sigma^2}\right)} \cap M \quad (14)$$

Now the position with the highest value in $\nabla^2 H$ is selected as the radius of the circle $(C_x, C_y)$, thus yielding the centre point of the left ventricle.

The frame $I_p$ is binarized preferably with the Otsu threshold method within the mask M, so the threshold is based on the histogram:

$$H_{p_m} = HIST(I_p \cap M) \quad (15)$$

Because the threshold is based on the frame histogram $Hp_m$ it could happen that next to blood tissue and myocardium tissue, also background were represented in the histogram $Hp_m$. Therefore, a second threshold is defined based on the histogram within the circle defined by its centre $(C_x, C_y)$ and radius $r_{min}$. The threshold preferably used during the binarizing process is:

Single Otsu on $H_{PM} \Rightarrow T_M; (\mu_{M_0}, \sigma_{M_0}); (\mu_{M_1}, \sigma_{M_1})$ (16)
Dual Otsu on $H_{PM} \Rightarrow T_{Md_1}; T_{Md_2}; (\mu_{Md_0}, \sigma_{Md_0}); (\mu_{Md_1}, \sigma_{Md_1});$
$(\mu_{Md_2}, \sigma_{Md_2})$ Single Otsu on $H_{Pcircle} \Rightarrow T_C; (\mu_{C_0}, \sigma_{C_0}); (\mu_{C_1}, \sigma_{C_1})$ $$T = \begin{cases} \mu_{C_1} - \sigma_{C_1} & \text{if } (T_M > \mu_{C_1}) \wedge (T_{Md_1} > \mu_{C_1}) \\ T_{Md_1} & \text{if } (T_M > \mu_{C_1}) \wedge (T_{Md_1} \leq \mu_{C_1}) \\ T_M & \text{otherwise} \end{cases}$$

Within this binarized image the object is extracted in which the centre $(C_x, C_y)$ and the mean position derived from the two- and four-chamber intersection lines $\bar{p}$ are located. The left ventricle may contain papillary muscles, so the centre $(C_x, C_y)$ or $\bar{p}$ need not lie within the extracted object. In such case the process is repeated for the next slice, above and/or below.

After successfully locating the left ventricle according to block 45, the end-diastole and end-systole phases are automatically determined in block 46 (estimate ED/ES heart phase), by:

$$ED = \arg\max(\text{Area}_i)$$
$$ES = \arg\min(\text{Area}_i) \quad (17)$$

Herein, $\text{Area}_i$ is the area of the object extracted with the threshold T obtained through applying expression 16 on the frame i from the current short-axis slice. Again the binarization is performed within the mask M.

Finally, in block 47 the base short-axis slice and apex short-axis slice are defined at the end-diastolic phase as computed by expression 17. For each frame $I_p$ within the end-diastolic phase the frame is binarized according to expression 16 which gives $B_i$. The process starts at the "seed" frame in which the left ventricle centre position has been determined previously, looking at the frame above and below.

Within each frame the following steps are performed, looking once at the frames spatially above and once looking at the frames spatially below.

Perform thresholding on frame $I_p$ according to expression 16 that gives $B_i$.

Intersect with mask M

Fill holes located in $B_i$ by using a morphology flood fill algorithm.

Extract the object that obtains the centre position $C_p$ The extracted object gives a global estimation of the endocardial contour location $B_{endo_i}$ Define $\text{Area}_i$ and $\text{perimeter}_i$ of extracted object $B_{endo_i}$ Compute the circularity (C) of the extracted object by:

$$C = \frac{4 \cdot \pi \cdot \text{Area}_i}{\text{Perimeter}_i^2} \quad (18)$$

If the circularity is below a predefined threshold, or if the computed area ($\text{Area}_i$) is three times above the area of the frame in which the left ventricle position is defined, the process stops and a ventricle boundary is defined as Ventricle boundary[ ]=i Centre position $C_p$ is adjusted according to:

$$C_p \Rightarrow \begin{cases} x = \dfrac{\sum\limits_{pixels} x}{Area_i} \\ y = \dfrac{\sum\limits_{pixels} y}{Area_i} \end{cases} \quad (19)$$

The global estimation of the epicardial border is defined $B_{epi_j}$

The algorithm for segmenting the epicardial border is based on a radial minimum cost algorithm and uses as starting entity the estimated boundary of the endocardial $B_{endo_j}$. A detailed description will be given herebelow when describing the segmentation of the left ventricle epicardial.

The mean area is found from the frames above and below the seed frame. Therewith the apex and base slice are defined as:

$$\overline{Area1} = \dfrac{\sum\limits_{i=seedframeb_1}^{Vb_1} Area_i}{Vb_1 - seedframe} \quad (20)$$

$$\overline{Area2} = \dfrac{\sum\limits_{i=Vb_2}^{seedframe} Area_i}{seedframe - Vb_2}$$

$$\text{apex\_slice} = \begin{cases} Vb_1 & \text{if } \overline{Area1} < \overline{Area2} \\ Vb_2 & \text{otherwise} \end{cases}$$

$$\text{base\_slice} = \begin{cases} Vb_1 & \text{if } \overline{Area1} \geq \overline{Area2} \\ Vb_2 & \text{otherwise} \end{cases}$$

The right ventricle is localize by subtracting the global estimation of the epicardial border in each frame ($B_{epi_j}$) from the thresholded image $I_p$ according to expression 16 masked with M, this yields to a global estimation of the right ventricles endocardial border, defined as $RV_{endo_j}$. This ends the discussion of FIG. 4.

Now, turning back to FIG. 1, in block 10, the location of the left ventricle is identified. Thus, the indicating in the 4D stack of the left/right ventricle position, the end-diastolic phase, end-systolic phase, apex slice, base slice and the global boundary positions of the left ventricle epicardial have been done.

In block 11, the segmentation of the endocardial boundary is performed in a complete slice, which gives a spatiotemporal 3D image (i.e. 2D plus time) within the area eroded n times around the estimated epicardial boundary and masked with M when segmenting the left ventricle. During the segmentation of the right ventricle, the estimated endocardial boundary masked with M is used. During the erosion a disc-structured element is used with radius one. For the segmentation a fuzzy connectedness algorithm can be used. The algorithm is preferably based upon the well-known concept of fuzzy objects in which image elements (pixels/voxels) exhibit a similarity or "hanging togetherness" both in geometry and in grey scale. See J. K. Udupa, S. Samarasekera, "Fuzzy-Connectedness and Object Definition: Theory, Algorithms and Applications in Image Segmentation" Graphic Models, Image Processing, vol. 58, 246-261, 1996, herein incorporated by reference in its entirety.

Pixels/voxels relate to each other by their adjacency and similarity. For simplicity, adjacency is defined as two neighbouring pixels in a (3D equivalent of) 4-connectivity sense. Therefore, only left/right, top/bottom and front/back neighbours are considered to have a relation. This relation is expressed by their similarity with respect to pixel grey values (also called affinity). It depends on the application which relation is used for finding similarity. Among various standard relations, in the preferred embodiment affinity $\mu$ is expressed as a weighted sum of a Gaussian and an additive Gaussian. The additive Gaussian is based on the intensity (grey value) P and the Gaussian on the intensity difference (gradient) G.

$$\mu(P_C, P_D) = F(P) \cdot N(G)$$

with $$P = (P_C + P_D)/2$$

$$G = P_C - P_D \quad (21)$$

in which $P_C$ and $P_D$ are the intensities of two neighbour pixels. The function N is a Gaussian or standard Normal function, specified by the mean $\mu$, and standard deviation $\sigma$.

Figure 5:
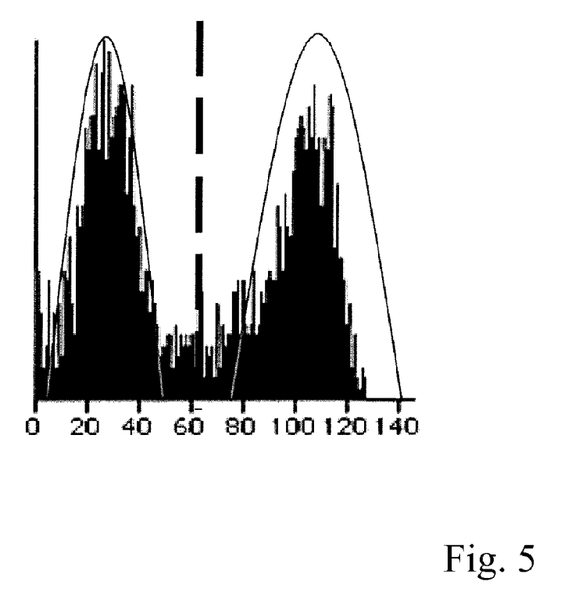
FIG. 5 is an exemplary pixel intensity histogram of the heart's left ventricle.

The function F is an adaptive Gaussian: the pixels inside the endocardium have an intensity distribution given by the right peak in the image histogram in FIG. 5. First, we could take this distribution modelled as a Gaussian $N_2$. However, additional knowledge is present: pixels outside the endocardium may not be included in the object to be extracted. Therefore, we have to penalise these pixels by adding a second term in F:

$$F = S \cdot (1 - N_1) \quad (22)$$

$$S = \begin{cases} N_2 & \text{if } P \leq \mu_2 \\ N_2 & \text{with } \sigma = 3\sigma_2 \text{ if } P > \mu_2 \end{cases}$$

In this respect, FIG. 5 illustrates an exemplary pixel intensity histogram of the heart's left ventricle. In particular, S generally equals a Gaussian distribution function $N_2$, but for intensities above the mean $\mu_2$ it is broadened by taking a standard deviation that is 3 times the true value. This pseudo Gaussian will cause pixels with large intensities to also be extracted when they would otherwise be excluded. This takes the fact into account that one or two frames sometimes show hyper intensities within the endocardium occur that are caused by blood flow which leads to locally high concentrations of protons. The second term in expression (22) is the penalty term: grey values below the threshold (dashed line in FIG. 5 separating the myocardium from the endocardium) will have an extra low affinity.

To start extracting the fuzzy object, a seed point is needed which should be located inside the expected object. Taking the symbol $f_o(c)$ to represent the scene value at position c, the pseudo code for the algorithm follows:

1. All scene values are set to zero and the scene value at the seed point is set to 1.
2. Push each neighbour of the seed point to the queue if its affinity strength is greater than 0.
3. Enter a while loop:
    a. Remove an element from the queue. Its position is denoted by c. If queue is empty then the extraction is completed.

b. Find maximum of weakest affinity strength around this element. For each neighbour d the affinity strength is computed and the minimum (weakest) of this strength and the existing scene value $f_o(d)$ at the position of the neighbour is taken. The maximum $f_{max}$ of these values for all 6 neighbours is derived then.

c. If the maximum value $f_{max}$ is larger than the existing scene value $f_o(c)$ then
  1. set scene value at c equal to the found maximum value, so $f_o(c)=f_{max}$.
  2. push all elements around c with affinity strength >0 to queue.

d. endif 2. endwhile

The output of the algorithm is a so-called "scene" giving at each position in the 3D image/stack the connectivity or measure of "hanging-togetherness" regarding the seed point. Also here, a segmentation step must assign a scene value to the object or not. The scene is threshold conform:

$$T_{scene} = \text{scene}_i \exists_i \{\sigma_x > \min_x, \sigma_y > \min_y, \sigma_g > \min_g, i \geq \min_n\} \quad (23)$$

Here, $\sigma_x$ and $\sigma_y$ are the standard deviations in x and y direction, respectively, of the elements included in the thresholded scene, and $\sigma_g$ is the standard deviation of the grey values when implementing the threshold. From the seed frame a threshold is deduced from this segmented image: $\min_x$, $\min_y$, $\min_g$ are derived, and $\min_n$ are the numbers of elements found from this segmented frame.

After thresholding the scene with the value defined from expression 23, the endocardial contours for the left ventricle or right ventricle are extracted. The final step in segmenting the left ventricles endocardial contour is the fine tune step. Therein two methods are presented. In one method the endocardial contour is fine tuned by means of a convex hull operation. In the second method the endocardial contour is forced into a smooth circular behaviour, which is more realistic from a physiologic point of view. This applies especially when analysing regional functional parameters of the left ventricle, such as wall thickness, wall thickening and wall motion. It might mean that the endocardial volume is overestimated, for example in that the papillary muscle volume is added to the left ventricle blood volume. Deducing the papillary muscles and subtracting their volume from the endocardial volume will calculate the correct blood volume, see hereinafter. During the detection of the right ventricle endocardial contour the fine tune step is always the first method. The right ventricles epicardial boundary is not detected by the current procedure, caused by the limited spatial resolution of the MR images.

Block 12 presents the left ventricle epicardial segmentation. This will segment the epicardial contour as based on a radial minimum cost algorithm. The detected endocardial contour is used as seed data. From the endocardial contour a polar model is created with an origin wherefrom radial lines originate and in which the radials are separated by n degrees. The origin is the centre of gravity of the endocardial contour. This polar model is used to resample the original image.

The epicardial boundary also contains various transitions in grey levels, alternating from BRIGHT_TO_DARK and vice versa. Because we use derivatives for edge detection, the sign of the edge should be given. Thereto, the following approach with dynamic sign definition is introduced, as follows. For each polar scanline:

Compute the location of the position whereas the absolute derivative is maximum.

$$pos = \arg\max_x \left\{ \left| \frac{\partial}{\partial x} g(x) \right| \right\} \quad (24)$$

g represents the scanline
Define sign by:

$$l_{mean} = \frac{\sum_{i=0}^{pos} g(i)}{pos} \quad (25)$$

$$r_{mean} = \frac{\sum_{i=pos}^{resample\_width} g(i)}{resample\_width - pos}$$

if $(l_{mean} < r_{mean}) \Rightarrow \text{sign} = 1 \Leftrightarrow \text{DARK\_TO\_BRIGHT}$ if $(l_{mean} \geq r_{mean}) \Rightarrow \text{sign} = -1 \Leftrightarrow \text{BRIGHT\_TO\_DARK}$ The epicard contour is now described by:

$$C_S(i) = \min(-C_S(i,j) \mid \text{samples } j \text{ on scanline}) \quad (26)$$

$$C_S(i,j) = \left\{ \begin{array}{l} \left(\alpha \cdot \left(sign(j) \cdot \left(\frac{\partial}{\partial i} g_j(i)\right)\right)\right) + \\ (1-\alpha)\left(sign(j) \cdot \left(\frac{\partial^2}{\partial i^2} g_j(i)\right)\right) \end{array} \right\} + \frac{1}{2} n(i,j) \right\} \cdot \text{grey\_cost}(i,j)$$

$$n(i,j) = \left| \frac{\partial}{\partial i} g_{previous_j}(i) \right| + \left| \frac{\partial}{\partial i} g_{next_j}(i) \right|$$

$$\text{grey\_cost}(i,j) = \begin{cases} e^{-0.5\left(\frac{(g_j(i)-(\mu-\sigma))^2}{\sigma^2}\right)} & \text{if sign = BRIGHT\_TO\_DARK} \\ e^{-0.5\left(\frac{(g_j(i)-(\mu+\sigma))^2}{\sigma^2}\right)} & \text{otherwise} \end{cases}$$

Based on the sign determination described earlier, the posterior junction of the right ventricle and the interventricular septum (the LVRV connection) is defined in block 13. For each frame inside the short-axis dataset the area is defined with the largest closed DARK_TO_BRIGHT sign by using expression 24 and 25. Then the first scan line sign in this frame going from dark to bright in a clockwise resample orientation of the above polar model is defined as the LVRV connection point.

An alternative segmentation for the left ventricle is presented in block 16. This method is based on expression 25. Therein, both the left ventricle endocardial and epicardial borders are segmented with a minimum cost approach. The main difference is that this method assumes an approximately correct location of a seed contour. From this assumption, segmentation propagates in time with each short-axis frame. The previous location of the contours is introduced into the cost function. Also the sign definition and tissue statistics are updated for each frame. The cost function is given by:

$$C_S(i,j) = \left( \begin{array}{l} \alpha \cdot \left(sign(j) \cdot \left(\frac{\partial}{\partial i} g_j(i)\right)\right) + \\ (1-\alpha)\left(sign(j) \cdot \left(\frac{\partial^2}{\partial i^2} g_j(i)\right)\right) \end{array} \right) \cdot \quad (27)$$

$$\text{grey\_cost}(i,j) \cdot \text{prev\_cost}(i,j)$$

where prev_cost$(i, j) = e^{\left(\frac{(\text{contour\_position}_j - i)^2}{\sigma_p^2}\right)}$ This approach is suitable for contour corrections in short-axis images.

The final step in segmenting the left ventricle is the identifying/segmenting of the papillary muscles in block 14, as follows. From knowing the boundary of the myocardium, the endocardial contour and the epicardial contour, the grey level distribution of the myocardium and the grey level associated to the blood pool can be derived accurately. This is done by computing the normal distribution of both tissues; then the associated threshold separates both distributions by using the Otsu threshold method in each frame $I_p$. In places where papillary muscles are located no blood can be present. The segmentation of the papillary is then reduced to thresholding the area given by the endocardial contour and extracting all segmented objects which exceed a predefined area based on binary morphology.

Block 15 presents a further improvement in the use of the two-chamber and four-chamber image set to define the 3D spatial left ventricle virtual apex position. Due to partial volume effects and the relative thick short-axis frame thickness used during the acquisition, the short-axis apex is difficult to localize, even by an experienced clinician. Now, in current state of the MRI art cine acquisition slices are about 8 mm thick, to have sufficient signal-to-noise ratio. Knowing the 3D spatial position of the left ventricle apex, it is possible to afterwards correct the volume of the left ventricle.

The spatial 3D apex position is computed in the end-diastolic phase and in the end-systolic phase as identified by expression 17. The derived endocardial contours in the short-axis frames in the end-diastolic phase are mapped on the two chamber and four chamber frames starting from the base slice to the apex slice as found when localizing the left ventricle. The mapping is done by:

$p_{2ch}[\ ]$endo$\cap l_{2ch}$ $p_{4ch}[\ ]$endo$\cap l_{4ch}$ (28)

The point lists $p_{2ch}$ and $p_{4ch}$ are mapped on to the long axis frames by transforming them first into the 3D world and then back onto the long axis plane as follows:

$$P_{3D} = T(P_{SA}) \cdot R_{SA} \cdot S(voxelsize_{SA}) \cdot point_{2D} \quad (29)$$

$$point_{2D_{LA}} = \begin{bmatrix} 1 \\ 1 \\ 0 \end{bmatrix} \cdot S(1/voxelsize_{LA}) \cdot R_{LA} \cdot T(P_{LA}) \cdot P_{3D} \quad (30)$$

Figure 6:
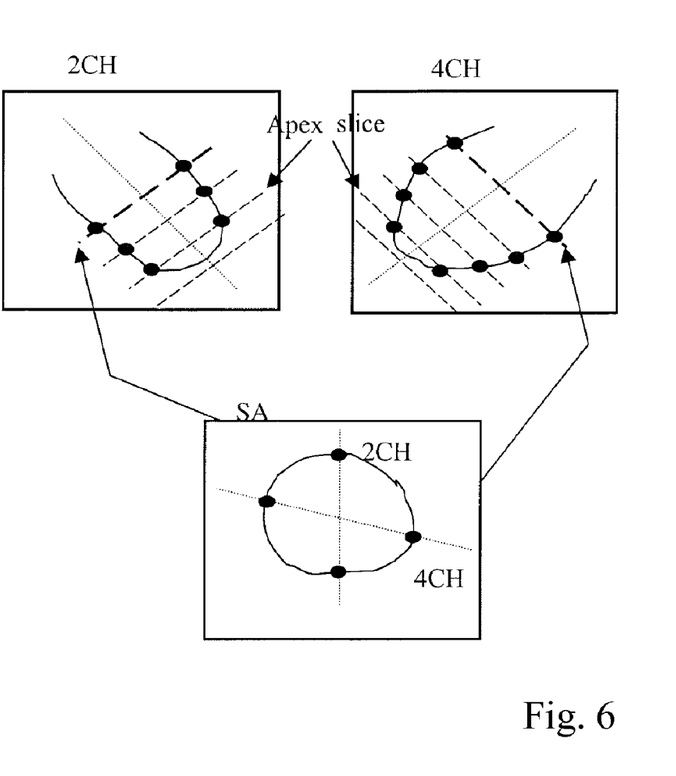
FIG. 6 illustrates a mapping procedure from long-axes (LA) slices to short-axis (SA) slices or inversely.

The above steps repeat for all short axis frames until reaching the apex short-axis slice. In this respect, FIG. 6 illustrates a mapping procedure from long-axes (LA) slices to short-axis (SA) slices or inversely. Through the various nodes indicated by black dots for both 2CH and 4CH cine sequences a well-known Catmull-Row spline curve is fitted. Also the apex containing slice has been shown:

$$s(t) \Rightarrow \begin{bmatrix} x = a_x t^3 + b_x t^2 + c_x t + d_x \\ y = a_y t^3 + b_y t^2 + c_y t + d_y \end{bmatrix} \quad (31)$$

$t \in [0, 1]$

This model is used to segment the left ventricles endocardial in the long axis view of the end-diastolic phase. Again, a radial minimum cost algorithm localizes the endocardial border, wherein both the 2CH and 4CH cine sequences contribute two border points, in the lower Figure part. The following function (expression 32) defines the boundary, by using CS as a cost function. Herein, g represents the resample image by the polar model.

$$C_s(i) = \min(-C_s(i, j) \mid \text{samples } j \text{ on scanline}) \quad (32)$$

$$C_s(i, j) = \frac{\left(\alpha \cdot \frac{\partial}{\partial_i} g_j(i) + (1-\alpha) \frac{\partial^2}{\partial_i^2} g_j(i)\right) \cdot}{(I_{ES} - I_{ED}) \cdot e^{-0.5\left(\frac{(g_j(i)-(\mu+\sigma))^2}{\sigma^2}\right)}}$$

The apex position is now located (expression 33) in the two-chamber and four-chamber for both long axis views, the 3D spatial apex being defined by expression 34:

$$\vec{p}_{midbase} = \frac{\vec{p}_{1_{base}} + \vec{p}_{2_{base}}}{2} \quad (33)$$

$$\vec{p}_{apex_{LA}} = \max \, dist(endo_{LA_i} - \vec{p}_{midbase})$$

$$\vec{p}_{apex} = \frac{T(P_{2CH}) \cdot R_{2CH} \cdot s(voxelsize_{2CH}) \cdot \vec{p}_{apex_{2CH}} +}{2} \quad (34)$$

$$\vec{p}_{apex} = \frac{T(P_{4CH}) \cdot R_{4CH} \cdot s(voxelsize_{4CH}) \cdot \vec{p}_{apex_{4CH}}}{2}$$

The same steps are repeated for the end-systolic phase. The apex position in the remaining phases is interpolated or extrapolated from the spatial 3D apex positions in both the end-diastolic and end-systolic phases: this will present the correct volume contribution for the apex slice, where the slice may, or may not intersect the apex position proper. In fact, the left ventricle volume computed through Simpson's rule is now corrected by fitting an ellipsoid through the 3D apex position and the apex slice.

Figure 7:
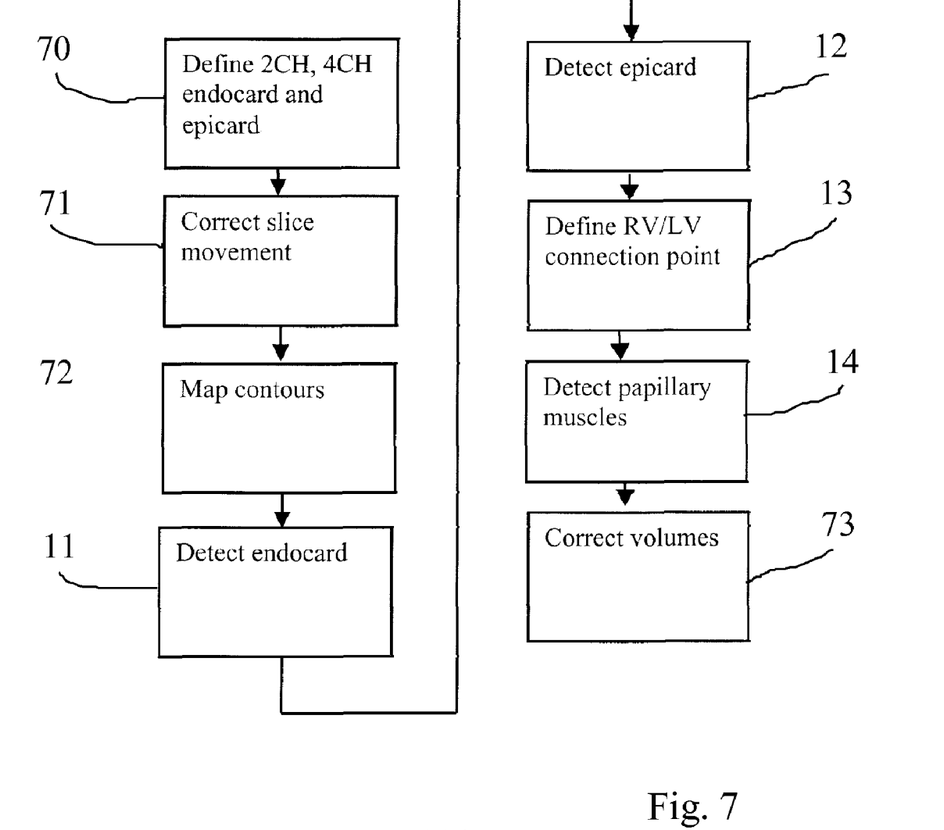
FIG. 7 is a flow chart illustrating segmentation operations that start from user-supplied long-axis (LA) input.

In this respect, FIG. 7 illustrates the starting of segmentation through presenting user LA input. Briefly the user identifies the start conditions in the two- and four-chamber image dataset. The advantage of this method is that the volume can be corrected according to the spatial location of the mitral valve derived from the long axis views as well. Now first, in block 70, the endocardial and epicardial left ventricle border in the 2-chamber and 4-chamber view both the end-diastole and end-systole cardiac heart phase must be present, for instance by manually drawing a spline based contour based on expression 32. Although, this represents operator input, all of the further blocks in FIG. 7 are executed automatically. Now, in block 71, 'in-plane' movement and breathing movement are corrected as described with reference to blocks 41 and 42 of FIG. 4. Next, in block 72 these long axis contours are mapped on the short-axis dataset. In pseudo code:

Walk through all slices $l_{2ch}=SA(\text{slice}) \cap 2CH$ Transformed into the 2CH $l_{4ch}=SA(\text{slice}) \cap 4CH$ Transformed into the 4CH $pt_{2ch}[\,]=s_{2ch}(t) \cap l_{2ch}\ s(t)$ 2chamber spline $pt_{4ch}[\,]=s_{4ch}(t) \cap l_{4ch}\ s(t)$ 4chamber spline  (35)

Convert the point—lists $pt_{2ch}$ and $pt_{4ch}$ into the SA slice
Define the slices which are part of the ventricle The segmenting of the left ventricle endocardial (block 11), epicardial (block 12), LVRV connection point (block 13) and the papillary muscles (block 14) are identical to previously described procedures. Next, in block 73, the volume as computed by Simpson's rule, corrected according to the spatial left ventricle apex and mitral valve position while excluding the volume 'outside' the left ventricle. Thereupon, the procedure is finished again.

Figure 8:
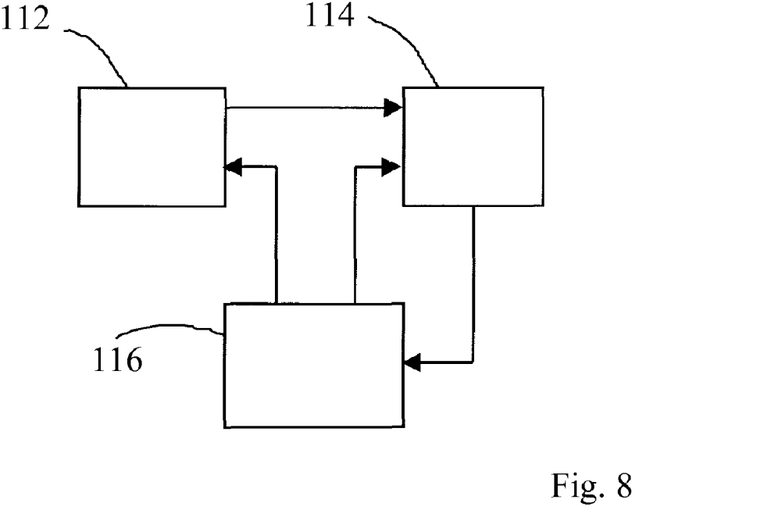
FIG. 8 is a high-level schematic diagram of an exemplary MRI apparatus.

FIG. 8 illustrates a high level functional block diagram of an exemplary MRI apparatus. For clarity, only three subsystems have been shown. Block 112 represents the MRI apparatus proper that operates under commands from user interface module 116 and will provide data to data processing module 114. The latter may be represented by any computer processing platform, including a workstation, personal computer and the like; it executes the generating of intermediate data and final results to user interface module 116, the latter furthermore allowing a dialog with data processing module 114. User interface 116 represents all kinds of input and output devices; it may also be embodied in a program storage device (e.g., CD-ROM or DVD or in one or more downloadable files) that store a computer program that is loaded onto and executed by a computer processing platform to carry out the inventive operations described herein. Further steps and procedures have either been detailed supra, or have been common knowledge to persons skilled in the art.

There have been described and illustrated herein several embodiments of a machine-based methodology for segmenting the image of the chambers of the human heart. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A method for machine-based segmentation of a cardiac chamber in four-dimensional magnetic resonance image data that contains short-axis cine sequences and long-axis cine sequences, the segmentation based on temporal variations in the image, the method performed by a data processing system with access to the image data, the method comprising:
preprocessing the image data to eliminate high local image variances and inhomogeneity;
processing the image data to localize the cardiac chamber within the image data by identifying positions of a base slice, an apex slice, an end-diastole phase, and an end-systole phase;
machine-based segmentation of an endocard based on fuzzy object extraction;
machine-based segmentation of an epicard through finding a radial minimum cost with dynamic sign definition and tissue classification; and
determining a volume of the cardiac chamber based upon the segmentations of the endocard and epicard, the volume corrected on the basis of an apex position on a curve which is obtained from image data corresponding to long-axis cine sequences.

2. A method as claimed in claim 1, wherein:
said cine sequences furthermore comprise two-chamber cine sequences and four-chamber cine sequences.

3. A method as claimed in claim 1, further comprising:
correcting for data acquisition movements.

4. A method as claimed in claim 1, further comprising:
automatic segmentation of the papillary muscles of the heart.

5. A method as claimed in claim 4, further comprising:
automatic detection of a position of an LVRV connection, the LVRV connection being a posterior junction between a right ventricle and the interventricular septum.

6. A method as claimed in claim 1, further comprising:
allowing for operator inspection of a subject-caused movement in the acquired MR image dataset by using system coordinates from an MR scanner apparatus.

7. A method as claimed in claim 6, further comprising:
automatic correction for subject-caused movement in the acquired MR image dataset by using system coordinates from an MR scanner apparatus.

8. A method as claimed in claim 1, wherein:
the segmentation of the endocard based on fuzzy object extraction starts from a seed contour.

9. A method as claimed in claim 1, wherein:
said volume correction takes into account a mitral valve position obtained from data corresponding to long axis cine sequences.

10. An apparatus for machine-based segmentation of a cardiac chamber in a four-dimensional magnetic resonance image data that contains short-axis cine sequences and long-axis cine sequences, the segmentation based on temporal variations in the data set and on features extracted from the image, the apparatus comprising:
preprocessing means for preprocessing the image data to eliminate high local image variances and inhomogeneity;
means for processing the image data to localize the cardiac chamber within the image data by identifying positions of a base slice, an apex slice, an end-diastole phase, and an end-systole phase;
means for machine-based segmentation of an endocard based on fuzzy object extraction;
means for machine-based segmentation of an epicard through finding a radial minimum cost with dynamic sign definition and tissue classification; and
means for determining a volume of the cardiac chamber based upon the segmentations of the endocard and epicard, the volume corrected on the basis of an apex position on a curve which is obtained from image data corresponding to long-axis cine sequences.

11. An apparatus as claimed in claim 10, wherein:
said cine sequences furthermore comprise two-chamber cine sequences and four-chamber cine sequences.

12. An apparatus as claimed in claim 10, wherein:
the machine-based segmentation of the endocard is based on a seed contour.

13. A non-transitory computer readable medium that is installable onto a computer processing platform, the computer readable medium readable by the computer processing platform, tangibly embodying a non-transitory program of instructions executable by the computer processing platform to perform methods steps for machine-based segmentation of the cardiac chambers in four-dimensional magnetic resonance image data that contains short-axis cine sequences and long-axis cine sequences, the segmentation based on temporal variations in the image and on features extracted from the image, the method steps comprising:

preprocessing the image data to eliminate high local image variances and inhomogeneity;

processing the image data to identify positions of a base slice, an apex slice, an end-diastole phase, and an end-systole phase machine-based segmentation of an endocard based on fuzzy object extractions;

machine-based segmentation of an epicard through finding a radial minimum cost with dynamic sign definition and tissue classification; and determining a volume of the cardiac chamber based upon the segmentations of the endocard and epicard, the volume corrected on the basis of an apex position on a curve which is obtained from image data corresponding to long-axis cine sequences.

14. A computer readable medium as claimed in claimed 13, the method steps further comprising: correcting for data acquisition movements.

15. A computer readable medium as claimed in claim 13, the method steps further comprising:

automatic segmentation of the papillary muscles of the heart.

16. A computer readable medium as claimed in claim 13, the method steps further comprising:

allowing for operator inspection of a subject-caused movement in the acquired MR image dataset by using system coordinates from an MR scanner apparatus.

17. A computer readable medium as claimed in claim 16, the method steps further comprising:

automatic correction for subject-caused movement in the acquired MR image dataset by using system coordinates from an MR scanner apparatus.

18. A computer readable medium as claimed in claim 13, wherein:

the curve is obtained from image data corresponding to two-chamber and 4-chamber long axis cine sequences.

19. A method as claimed in claim 1, wherein:

the curve is obtained from image data corresponding to two-chamber and 4-chamber long axis cine sequences.

20. An apparatus as claimed in claim 10, wherein:

the curve is obtained from image data corresponding to two-chamber and 4-chamber long axis cine sequences.

\* \* \* \* \*